United States Patent [19]

Sampietro

[11] 4,237,689
[45] Dec. 9, 1980

[54] INTERNAL COMBUSTION ENGINES

[76] Inventor: Achilles C. Sampietro, P.O. Box 2484, Delray Beach, Fla. 33444

[21] Appl. No.: 909,780

[22] Filed: May 26, 1978

Related U.S. Application Data

[63] Continuation-in-part of Ser. No. 746,966, Dec. 2, 1976, abandoned.

[51] Int. Cl.³ .................... F02B 37/00; F02B 29/04
[52] U.S. Cl. ............................................. 60/599; 62/434
[58] Field of Search ......................... 60/39.67, 599; 62/323 R, 500, 434; 123/119 CD

[56] References Cited

U.S. PATENT DOCUMENTS

| 2,339,185 | 1/1944 | Nettel | 60/39.67 X |
| 2,353,966 | 7/1944 | Newcombe | 123/119 CD X |
| 2,571,256 | 10/1951 | King | 60/599 X |
| 2,983,265 | 5/1961 | Robbins et al. | 123/119 CD |

FOREIGN PATENT DOCUMENTS

| 1963232 | 7/1970 | Fed. Rep. of Germany | 60/599 |
| 364756 | 2/1973 | U.S.S.R. | 60/599 |

*Primary Examiner*—Michael Koczo
*Attorney, Agent, or Firm*—Blanchard, Flynn, Thiel, Boutell & Tanis

[57] ABSTRACT

The air supplied to an internal combustion engine is cooled by a refrigeration process powered either by power generated by the engine or by heat from the exhaust gases. Multi-stage cooling may be used in conjunction with a separator for removing condensed ice particles from the cooled air. The engine may be a gas turbine or a reciprocating engine and the latter may be turbo-charged or super charged.

6 Claims, 6 Drawing Figures

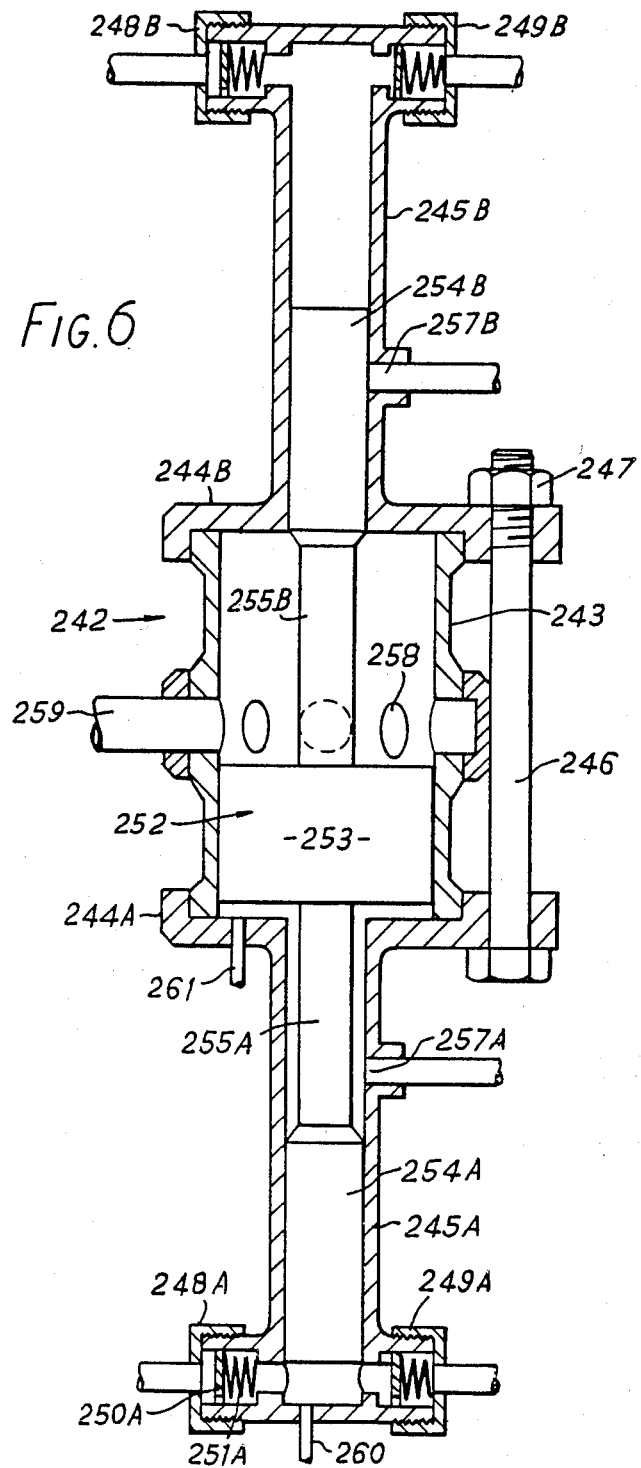

INTERNAL COMBUSTION ENGINES

This application is a Continuation-in-part of my co-pending application Ser. No. 746,966 filed Dec. 2, 1976, now abandoned.

BACKGROUND OF THE INVENTION

The present invention relates to improvements in internal combustion engines with a view to increasing their efficiency while reducing or at least avoiding any increase in the formation of nitrogen-oxygen compounds and while minimizing the physical size of auxiliary equipment required for this purpose.

BRIEF DESCRIPTION OF THE INVENTION

According to the present invention there is provided a method of operating an internal combustion engine in which heat is removed by a refrigeration process from air prior to compression of said air and combustion of a fuel with the said compressed air in the engine, the heat removal being effected by a refrigeration process powered by energy obtained from the exhaust of the engine.

Also according to the present invention there is provided an internal combustion engine having an inlet for air for compression and combustion with fuel within the engine to generate power, wherein the engine includes refrigeration means powered by energy obtained from the exhaust of said engine, the refrigeration means being arranged to extract heat from the air prior to the or each compression step.

PRIOR ART

U.S. Pat. No. 3,306,032 dated Feb. 28, 1967 to P. P. Chaffiotte discloses refrigeration means powered by mechanical power taken from an engine to cool compressed air leaving a two-stage turbo-compressor prior to admission to the engine.

U.S. Pat. No. 2,353,966 dated July 18, 1944 to C. K. Newcombe discloses (in FIG. 3) refrigeration means powered by exhaust heat of an engine for removing heat from supercharged air prior to admission into the engine.

U.S. Pat. No. 2,548,508 dated Apr. 10, 1951 to A. S. Wolfner discloses an absorption refrigeration process powered by cooling jackets of an engine for supplying a cooling liquid into direct contact with air supplied to an internal combustion engine.

The present invention avoids the disadvantages of the prior art arrangements in which the refrigeration is applied to relatively hot compressed air at the outlet of a compressor as in the first two abovementioned patents while enabling a denser cool charge to be fed to the engine without the addition of a further substance to the air.

The cooling of the inlet air to the or each compression stage increases its density and thereby increases the mass flow of air into the compressor. A correspondingly greater quantity of fuel may be burnt with the air within the engine thereby increasing the power output of the engine. At the same time, the cooling clearly reduces the initial temperature of the charge within the engine and thus it also ensures that combustion takes place at lower temperatures thereby reducing the formation of nitrous oxides and similar pollutants which tend to be generated in high-efficiency engines as a result of high temperatures normally generated in such engines.

The necessary energy for powering the refrigeration means is obtained by extracting energy from the exhaust gases of the engine. This energy may be mechanical power obtained for example by means of an exhaust-driven turbine or it may be heat which may be used for example to boil a liquid to power a jet-type compressor or such heat may be used to power refrigeration apparatus of the absorption type.

The invention may be applied to supercharged engines, that is engines having a compressor driven by the engine to deliver air to the engine inlet at a super-atmospheric pressure. The refrigeration means then remove heat from the air at the entry to the compressor, thereby increasing the mass flow of air through the compressor. The application of supercharging to engines according to the invention results in a compact high power engine of high efficiency and low emission of pollutants.

In general, steps must be taken to avoid damage as a result of condensation and freezing of the moisture in the air used for combustion. For this purpose, it will normally be necessary to pass the cooled air through a separating device, conveniently of the cyclone type, just after heat has been removed from the air by the refrigeration means.

Two or more stages of cooling may be used if required. Where the refrigeration means is powered by heat from the exhaust gases, the second or later cooling stages may be powered by the hottest exhaust gases, the resulting lower temperature exhaust gases being used to power the first or earlier stages.

The invention may be applied to both piston and cylinder engines and to gas turbine engines. In the case of the former engines, it is preferred not to use a carburettor arrangement since the reduction in temperature may cause the normally liquid hydrocarbon fuels to condense out. Instead, fuel injection is preferred. Ignition may be by spark ignition or compression ignition.

THE DRAWINGS

Embodiments of the invention will now be described by way of example with reference to the accompanying diagrammatic drawings, in which:

FIG. 1 shows an internal combustion engine of the piston and cylinder type having refrigeration means mechanically powered by kinetic energy from the exhaust gases of the engine and serving to remove heat from inlet air supplied to the engine, FIG. 2 shows a turbo-charged engine havine refrigeration means powered by heat from the exhaust gases, FIG. 3 shows a spark-ignition fuel-injection engine having a two-stage refrigeration system powered by heat from the exhaust gases, FIG. 4 shows the application of the invention to a gas turbine installation.

FIG. 6 shows a feed pump.

PREFERRED EMBODIMENTS

Figure 1:
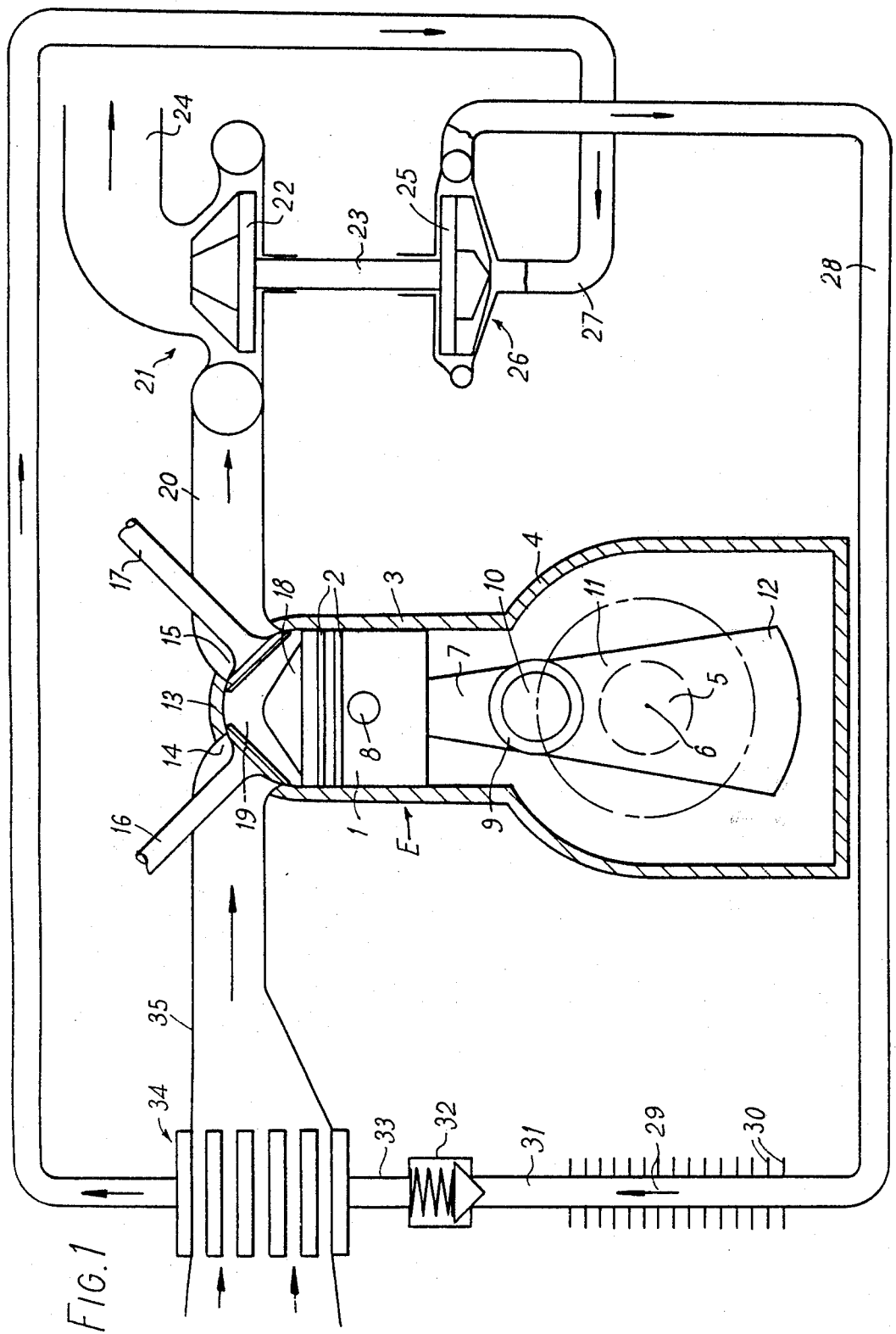

The compression-ignition internal combustion engine shown diagrammatically in FIG. 1 follows convention practice insofar as it comprises a piston 1 fitted with piston ring 2 and slidable in a cylinder 3 arranged above a crank case 4 containing a crankshaft 5 which is mounted for rotation in the crank case 4 about an axis 6 by means of main bearing (not shown). The piston 1 is coupled to the crankshaft 5 through a connecting rod 7, the upper end of which is articulated to the piston 1 by means of a gudgeon or wrist pin 8 while its lower end is formed as a split big-end bearing 9 engaged on a crank pin journal 10 carried by webs 11 of the crankshaft 5, the webs being extended on the opposite side of the crankshaft axis 6 to form balance weights 12.

The upper end of the cylinder 2 is closed by a cylinder head 13 which may be of the integral or detachable types as required and is here shown as being of the "hemispherical" type having large inlet and exhaust ports 14 and 15 which are respectively closed by an inlet valve 16 and an exhaust valve 17 which have their axes substantially at right-angles to each other. The piston 1 carries a substantially conical protuberance 18 to reduce the volume of the combustion chamber 19 between the top of the piston 1 and the cylinder head 13 when the piston is in its uppermost or top dead centre position as illustrated in FIG. 1.

The engine described so far follows conventional practice and further description is, therefore, not considered to be necessary. Furthermore, a fuel injector (not shown) is mounted at a convenient point of the cylinder head 13. Exhaust gases leaving the exhaust port 15 when the valve 17 opens are fed through an exhaust duct 20 to drive an exhaust-driven turbine 21 having a turbine rotor 22 mounted on a shaft 23. The spent exhaust gases from the turbine 21 leave through a duct 24 leading to an appropriate silencer (not shown) from which they may discharge to the atmosphere. At its other end, the shaft 23 is secured to a rotary impeller 25 of a compressor 26 for a Freon refrigerant which it receives from a pipe 27 and delivers through a pipe 28 under pressure to a condenser 29 where the compressed Freon gives up heat to the surrounding air with the aid of fins 30. From the condenser 29, the cooled pressurized refrigerant passes through a pipe 31 and an expansion valve 32 to a pipe 33 in which the refrigerant is now in liquid form.

The pipe 33 conveys the refrigerant to a cooling matrix 34 extending across an inlet duct 35 for supplying inlet air to the inlet port 14 for compression and combustion in the engine E. In the matrix 34, the liquid refrigerant absorbs heat from the incoming air in heat exchange relationship therewith (but without mixing therewith). The refrigerant or at least a major portion thereof is vaporised, receiving the necessary latent heat for this from the air entering the inlet duct 35. The resulting refrigerant vapour or mixture of vapour and liquid refrigerant leaves the matrix 34 through a pipe 36 connected to the pipe 27.

In operation, the engine shown in FIG. 1 is started up in the normal manner. Before each firing stroke of the engine air is drawn into the combustion chamber and cylinder through the inlet duct 35 and the annular space between the valve 16 and its port 14. After each power stroke of the engine, the spent gases are discharged through the exhaust port 15 past the valve 17 in its open position into the exhaust duct 20 to drive the rotor 22 of the turbine 21. The turbine drives the impeller 25 of the compressor 26 and thus begins to operate the refrigeration circuit formed by the elements 26, 29, 32 and 34 to abstract heat from the air entering the duct 35 by heat exchange in the matrix 34 and to reject heat to the atmosphere in the condenser 29.

As a result, the density of the air in the inlet 35 is increased. Thus, for a given swept volume for the engine E and a given inlet pressure in the inlet duct 35, a constant volume of air will be drawn into the cylinder at each induction stroke. Since the temperature of the air has been reduced and its density thereby increased, the effect of the refrigeration circuit will be to increase the mass or weight of air drawn into the cylinder during each induction stroke. Hence, for a given swept volume and compression ratio, the maximum amount of fuel which can be burnt with the charge of air is increased, thereby increasing the maximum power output of the engine. Further, since the initial temperature of the charge within the engine is lowered, the maximum temperatures attained during combustion may also be reduced, thereby reducing the risk of forming noxious pollutants such as nitrogen oxides.

Although FIG. 1 only shows a single cylinder engine, it will be appreciated that the engine may be replaced by a multiple-cylinder engine. Power output is controlled by adjusting the quantity of fuel injected into the combustion chamber in each operating cycle.

Figure 2:
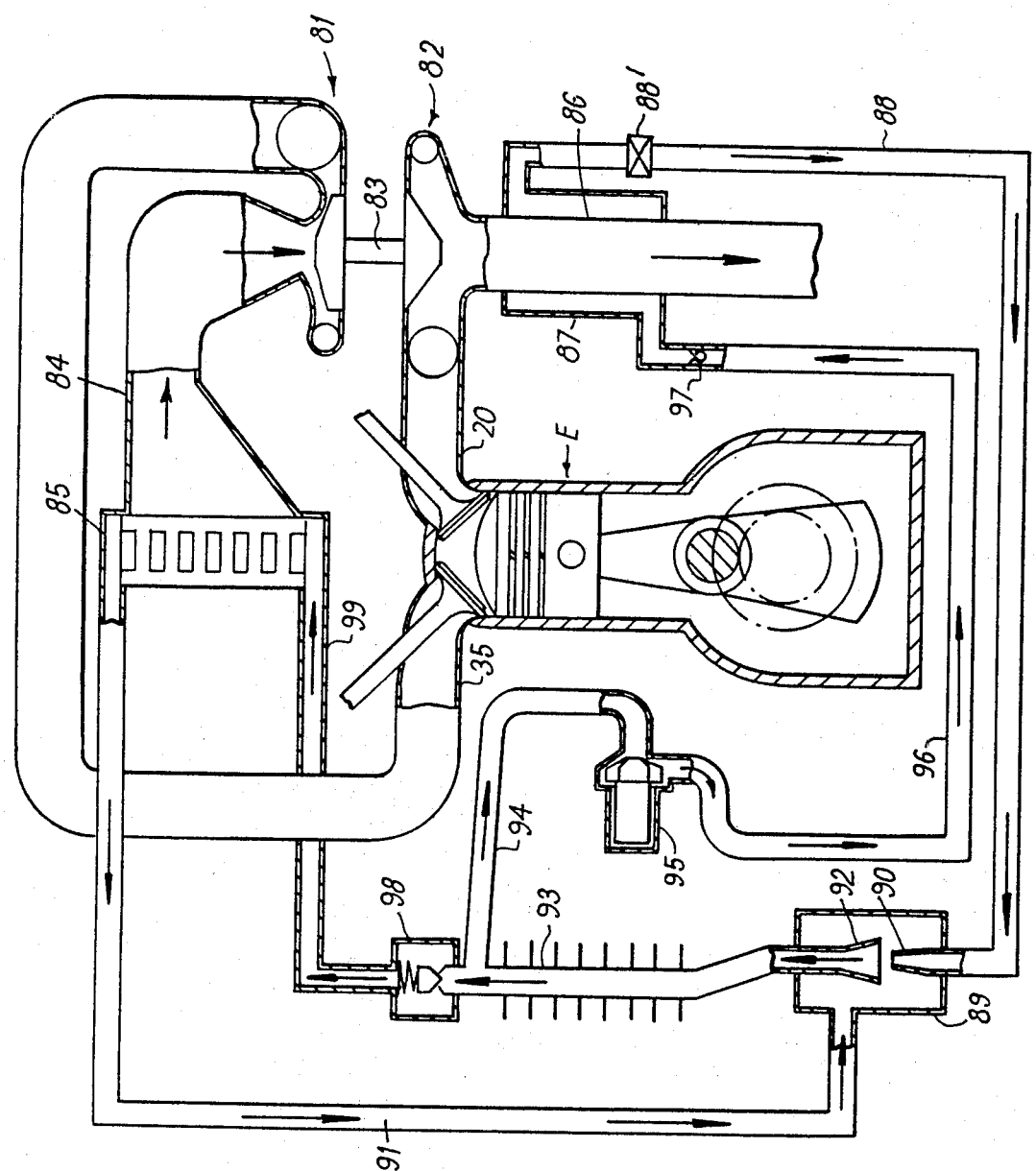

The exhaust turbo-charged engine assembly shown in FIG. 2 makes use of heat from the exhaust gases from the turbine for the purpose of energising the refrigeration circuit for removing heat from the air being supplied to the engine inlet for combustion. In the arrangement shown in FIG. 2, a supercharger 81 is driven by an exhaust-driven turbine 82 through a shaft 83 and draws through a duct 84 and a cooling matrix 85 and delivers the air at a super-atmospheric pressure to the inlet duct 35 of the engine E. The exhaust gases leaving the turbine 82 pass through a duct 86 part of which extends through a vapour generator 87 containing a refrigerant. Heat transmitted through the wall of the duct 86 vaporises refrigerant in the vapour generator 87 under pressure and this vapour opens a valve 88' at a predetermined pressure and is conveyed by a pipe 88 to a jet-type compressor 89 into which it discharges as a jet from a nozzle 90. Further refrigerant vapour enters the compressor 89 through a pipe 91 leading from the matrix 85 ad is drawn into a collector 92 and compressed by the jet leaving the nozzle 90. From the collector 92, the pressurized refrigerant is fed to a condenser 93. From the outlet of the condenser 93, some of the refrigerant is returned to the generator 87 by a pipe 94, sealed glandless pump 95, pipe 96 and non-return valve 97. The remainder of the refrigerant leaving the outlet of the condenser 93 passes through an expansion valve 98 into a pipe 99 leading to the matrix 85.

Figure 3:
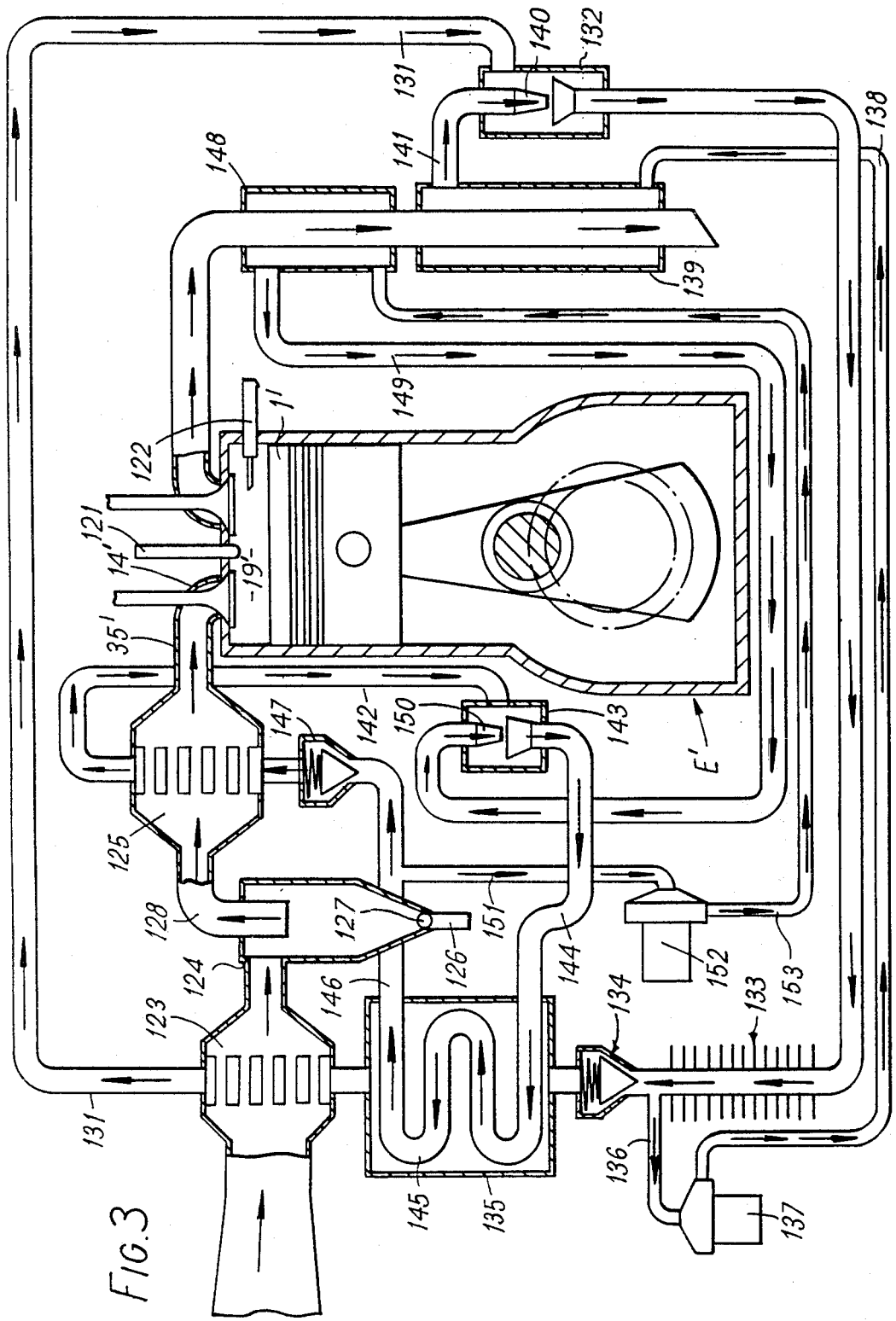

FIG. 3 shows a piston and cylinder engine installation having two cooling stages, each stage being powered by energy recovered from the heat of the exhaust gases of the engine, the two cooling stages being arranged in cascade.

As shown in FIG. 3, the engine E' is of the "Proco" kind produced by the Ford Motor Company of the U.S.A. The piston 1' has a flat top and the inlet port 14' and inlet duct 35' are arranged to deliver a cooled charge of air into the combustion chamber 19' with a tangential swirl component. Fuel is injected into the combustion chamber 19' by a fuel injector 121 at the appropriate point of time and the resulting mixture is ignited by a spark plug 122.

Air is supplied to the inlet passage 35' through a first cooling matrix 123, a cyclonic separator 124 and a second cooling matrix 125. The air cooled by the first matrix 123 enters the separator 124 with a tangential component as a result of which any ice particles or water droplets formed from moisture in the air are thrown outwards onto the interior wall of the separator 124 and can then descend under gravity to an outlet 126 which is normally closed by a float valve member 127 but which can be lifted by any collected body of water to allow the latter to be discharged.

The air leaves the separator 124 adjacent its axis through a pipe 128 and then passes through the second matrix 125. The separator 124 may also be used in any of the embodiments shown in FIGS. 1 to 5 to prevent icing up of the inlet duct 35.

Refrigerant leaving the matrix 123 through a pipe 131 is compressed by a jet-type compressor 132, passed through a condenser 133, expansion valve 134 and intercooler 135 and returned to the matrix 123. In order to power the compressor 132, some refrigerant is drawn off through a pipe 136 at a point between the condenser 133 and expansion valve 134 and pumped by a feed pump 137 through a pipe 138 to a vapour generator 139, heated by exhaust gases from the engine E', the resulting pressurised vapour being supplied to the jet nozzle 140 of the compressor 132 through a pipe 141.

Similarly, refrigerant leaving the matrix 125 is conveyed by a pipe 142 to a second jet-type compressor 143 where it is compressed and then passes through a pipe 144 to a cooling coil 145 within the intercooler 135. The coil 145 acts as a condenser since heat is removed from it by the refrigerant in the first refrigeration circuit which cools the matrix 123.

From the cooling coil 145, the refrigerant in the second circuit passes through a pipe 146 to a second expansion valve 147 and thence returns to the second matrix 125.

In order to power the jet compressor 143 of the second circuit, a second vapour generator 148 is located to be heated by the exhaust gases upstream of the first vapour generator 139 and delivers vaporised refrigerant under pressure through a pipe 149 to the nozzle 150 of the second jet compressor 143. In order to supply the second vapour generator 148 with liquid refrigerant, some liquid is drawn off from the pipe 146 through a branch pipe 151 by a sealed electrically driven feed pump 152 which delivers this liquid through a pipe 153 to the second vapour generator 148 against the pressure of the vapour therein.

As a further precaution against icing-up despite the low temperatures generated particularly as the incoming air approaches the inlet duct 35', it may be found useful to coat the surfaces of the matrices 123 and 125, the separator 124 and the connecting air passages with a "non-stick" or low friction material such as polytetrafluoroethylene.

Figure 4:
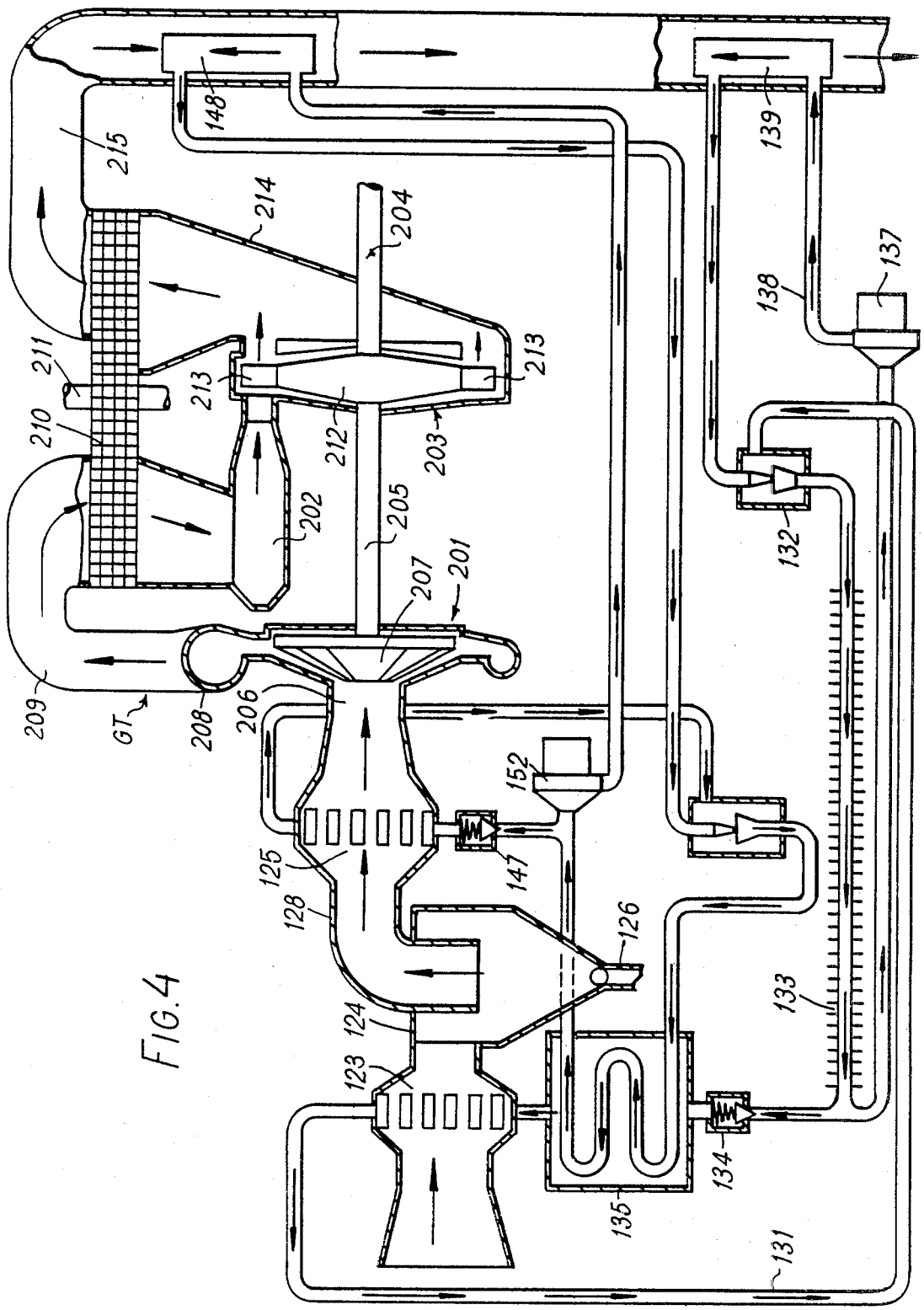

FIG. 4 shows the two-stage cooling arrangement of FIG. 3 applied to a gas turbine installation with a view to obtaining a corresponding increase in the density of the air supplied to the gas turbine and thus of the amount of fuel which can be burnt in the turbine and thereby to produce a corresponding increase in the output power available.

The gas turbine GT is shown schematically in FIG. 4 as comprising a compressor 201 a combustion chamber 202 and a turbine 203 supplying power to an output shaft 204 and also driving the compressor 201 through a shaft 205.

As shown, the compressor 201 is of the radial flow type having a central inlet 206 for receiving refrigerated dried air, a rotor 207 mounted on the shaft 205 for rotation within a volute casing 208 having an outlet duct 209 which delivers compressed air through a rotating heat recuperator 210 mounted for rotation on a shaft 211. The air is heated during its passage through the recuperator 210 by heat recovered from the exhaust gases and the heated compressed air then enters the combustion chamber or chambers 202 for combustion with fuel.

The resulting hot gases from the combustion chamber 202 pass into the turbine which is here shown as a single stage axial flow turbine having a motor disc 212 carrying turbine blades 213 at its periphery. In the arrangement shown in FIG. 4, the turbine disc 212 is connected to both shafts 204 and 205, but as those skilled in the gas turbine art will readily understand, a multi-stage turbine may be used with any of the well known arrangements. For example, the first stage of the turbine may drive the compressor wheel 207 through the shaft 205 while later stages of the turbine may form a separate turbine driving the output shaft 204. Moreover, the compressor 207 itself may be a multiple stage compressor having separate rotors driven by correspondingly separate turbine stages through concentric shafts. One of these shafts, or as shown in the drawing of shaft 205, may be connected through suitable gearing to drive the shaft 211 of the recuperator.

The exhaust gases leaving the turbine 203 (or multistage turbine) enter a duct 214 which leads the exhaust gases through the recuperator wheel 210 into an exhaust duct 215.

The air entering the inlet 206 is cooled by a two-stage refrigeration apparatus of the kind shown in FIG. 3. Accordingly, corresponding elements have been indicated by the same reference numberals as in FIG. 3. As in the case of the arrangement shown in FIG. 3, the two stages of the refrigeration apparatus are powered by vapour generators 139 and 148 mounted in heat exchange relation with the exhaust gases in the duct 215.

In general, the details of the various refrigeration circuits used in the arrangement shown in the various figures described above will be well known to and understood by those skilled in the art and further explanation is not therefore considered to be necessary. The choice of suitable refrigerant substances should present no difficulty. In many cases a suitable Freon (registered Trademark) may be used although in some cases water may be found to be suitable, for example in the arrangement shown in FIG. 1.

In a typical gas turbine installation, the compressor takes between 70 and 80% of the gross power output of the turbine. By cooling the air supplied to the compressor, the amount of work done by the compressor on a given weight of air in compressing it through a predetermined compression ratio is reduced. The compressor can thus be made smaller. Further, by reducing the temperature of the air supplied to the gas turbine, the maximum temperature attained within the gas turbine may be reduced for a given power output and efficiency, thus enabling cheaper materials to be used, particularly for the turbine blades. Alternatively, the fuel to air ratio may be increased thereby increasing the output of the gas turbine without exceeding the temperatures which can be withstood by currently available materials. Thus, for a given required output power the size of the turbine as well as that of the compressor may be reduced.

Figure 5:
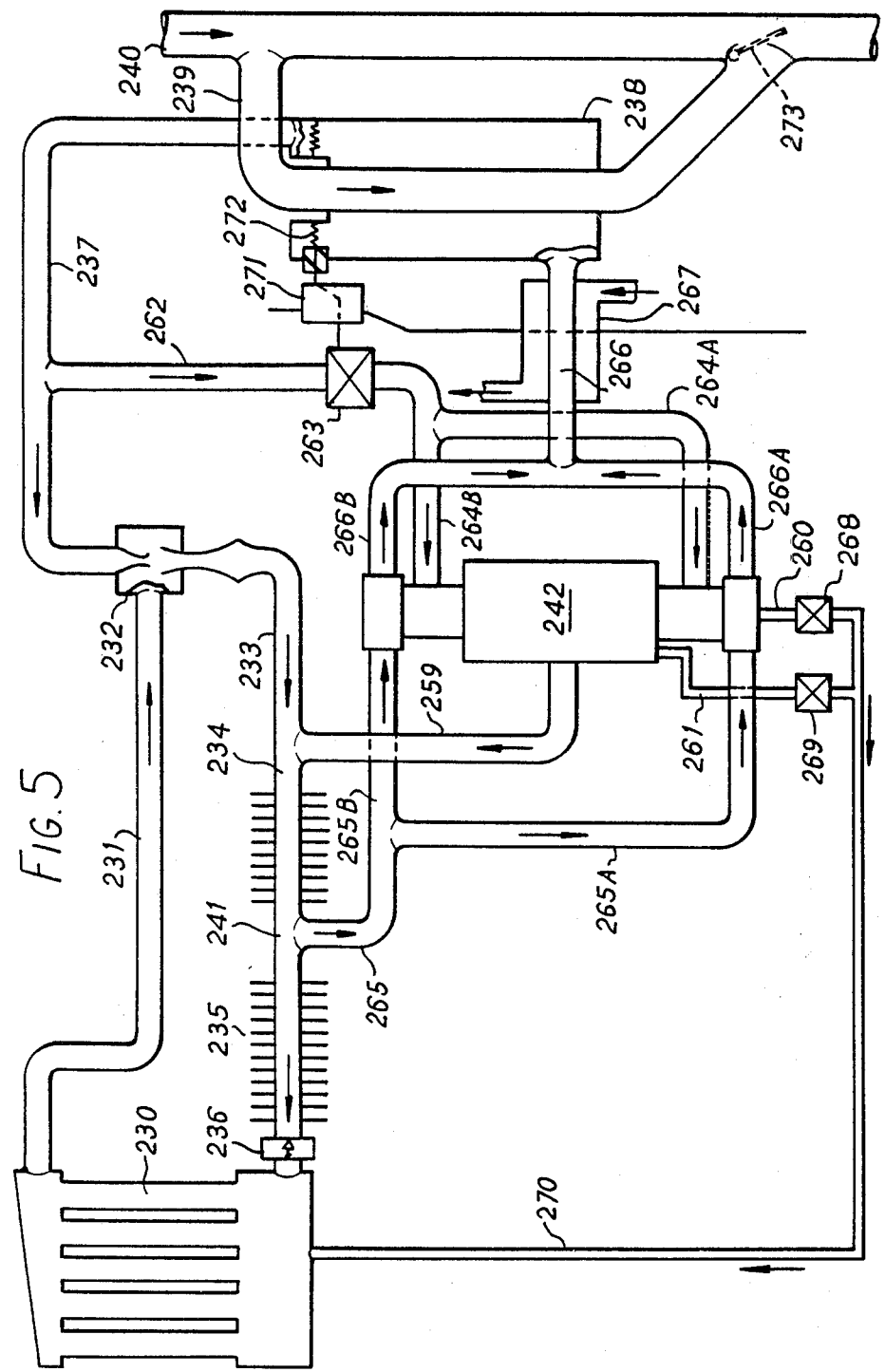
FIG. 5 shows an alternative cooling circuit for FIG. 2.

FIGS. 5 and 6 show a modified form of the refrigeration circuit shown in FIG. 2 although it will of course be understood that, as in the case of the FIG. 2 circuit, the refrigeration circuit shown in FIGS. 5 and 6 may be used with other types of engines.

Like the FIG. 2 circuit, the circuit shown in FIGS. 5 and 6 has an air-cooling matrix 230, connected by a pipe 231 to a jet-type compressor 232. The compressed refrigerant from the compressor 232 is conveyed by a pipe 233 through first and second condensers 234 and 235 connected in series and a resultant liquid refrigerant is returned to the heat exchange matrix 230 through an expansion valve 236 (if the latter is desired.

The jet-type compressor 232 is energized by a stream of high pressure vaporised refrigerant supplied through a pipe 237 from a vapour generator 238 heated by a branched loop 239 of the exhaust system 240 of the internal combustion engine (not shown).

Liquid refrigerant is supplied to the vapour generator 238 from the junction 241 between the first and second condensers 234 and 235 by means of a double-acting free-piston feed pump 242 shown in detail in FIG. 6. As can be seen in FIG. 6, the pump 242 has a central driving cylinder 243, the two end caps 244A and 244B of which are formed by flanged end portions of first and second pump cylinders 245A and 245B respectively. The two end caps 244A and 244B are held against the two ends of the cylinder 243 (with suitable sealing compounds or gaskets, not shown,) by means of a ring of tie-bolts 246 carrying nuts 247.

At its outer end, each pump cylinder 245A and 245B has an inlet valve 248A, 248B and an outlet valve 249A, 249B. Each inlet valve 248 and each outlet valve 249 is a non-return valve having a valve member indicated in the drawing as a disc in the case of the inlet valve 248A, this disc 250A being applied against its seat by a spring 251A.

Mounted within the assembly of cylinders described above is a free-piston assembly 252 which comprises a central large diameter piston 253 slidable in the cylinder 243 and first and second smaller diameter pump pistons 254A and 254B slidable in the respective pump cylinders 245A and 245B and connected to the piston 253 by stems 255A and 255B respectively, each of the stems being of smaller diameter than the pump pistons 254A and 254B.

Pressurized refrigerant vapour to power the driving cylinder of the pump is supplied through two inlets 257A and 257B which open in the side walls of the pump cylinders 245A and 245B. The length of each pump piston 254A,254B is such in relation to the position of the associated inlet 257A,257B that the pump piston acts as a slide valve and covers or exposes the inlet, in accordance with the position of the piston assembly 252. Thus, in the position shown in FIG. 6, the pump piston 254B closes the inlet 257B while the pump piston 254A exposes the inlet 257A which can therefore deliver high pressure refrigerant vapour against the lower face of the piston 253. A ring of outlet ports 258 in the centre of the pump cylinder 243 lead to an outlet 259 so that in the position shown in FIG. 6, the space within the pump cylinder above the piston 253 is connected to the outlet 259. Accordingly, the piston assembly is driven upwards so that the pump piston 254A draws in liquid refrigerant through the inlet valve 248A, the outlet valve 249A being closed, while at the same time the pump piston 254B drives liquid refrigerant out through the outlet valve 249B, the inlet valve 248B being held closed. After a time, the piston 254A closes the inlet 257A and the expanding refrigerant vapour below the piston 253 continues to drive the piston assembly upwards. Next, the outlet ports 258 are closed as the piston 253 moves past them and thereafter the lower edge of the pump piston 254B uncovers the inlet 257B, the inlet 257A remaining closed by the pump piston 254A. With the outlet ports 258 now uncovered by the piston 253, the high pressure refrigerant vapour from the inlet 257B is applied against the upper face of the piston 253 to drive it downwards again to the position shown in FIG. 10, thereby drawing in liquid refrigerant through the inlet valve 248B, the outlet 249B being closed, and to drive liquid refrigerant out through the outlet valve 249A, holding the inlet valve 248A closed.

In order to ensure that the piston assembly 252 always returns to an end position (as shown for example in FIG. 6) when the pump is shut down by turning off the supply to the inlets 257A and 257B, dump lines 260 and 261 are connected respectively to the lower ends of the pump cylinder 245A and the driving cylinder 243.

FIG. 5 shows the connection made to the feed pump shown in FIG. 6. A branch line 262 leads from the pump 237 to an electrically operated control valve 263, the output of which is connected to two branch lines 264A and 264B leading respectively to the inlets 257A and 257B. The outlet line 259 joins the pipe 233 upstream of the first condenser 234. The inlet valves 248A and 248B are supplied by branch lines 265A and 265B from a pipe 265 connected to the pipe 241 between the first and second condensers 234 and 235. The outlet or delivery valves 249A and 249B are connected by branch lines 266A and 266B leading to a pipe 266 extending through a heat exchanger 267 into the lower part of the vapour generator 238. The liquid refrigerant passing through the heat exchanger 267 is placed in heat exchange relationship with the engine coolant. The dump lines 260 and 261 are connected through electrically operated dump valves 268 and 269 to a dump pipe 270 which returns the dumped refrigerant to the system in the matrix 230.

Operation of the feed pump 242 by means of the valves 263, 268 and 269 is controlled by a control unit 271 in response to a liquid level sensor 272 in the upper part of the vapour generator 238. The sensor 272 may be for example of the float-operated switch type or as shown in FIG. 5 of the level-sensing wire type. When the level in the vapour generator falls below a predetermined value, the control unit 271 opens the main valve 263 and closes the dump valves 268 and 269. The pump 242 then operates to feed liquid refrigerant into the vapour generator 238 until the level within the vapour generator rises to a point at which the sensor 272 operates to cause the control unit 271 to close the valve 263 and open the dump valves 268 and 269.

As shown in FIG. 5, the vapour generator 238 is heated by the branch line 239 from the main exhaust line 240. The relative proportions of the total exhaust gas flow which passes through the branch line or loop 239 can be controlled by means of a flap valve 273 in one of the junctions between the branch loop 239 and the main exhaust line. The valve 273 may be interconnected with the power output control member of the engine. Furthermore, the heat exchanger 267 acts as a pre-heater so that in the event of a sudden increase in the engine power output required, heat can be taken from the engine coolant system in addition to the heat which can be taken from the exhaust. It will be appreciated that this pre-heater arrangement may also be applied to others of the embodiments described above.

Although the currently preferred embodiments of the invention have been described in detail above, it will be understood that many changes may be made without departing from the scope of the invention.

I claim:

1. In an internal combustion engine having an air inlet, at least one compression stage for said air, a fuel supply, a combustion chamber for burning said fuel with compressed air to supply power to an output member, first refrigeration means arranged to extract heat from air supplied to said inlet prior to the or each compression stage, and second refrigeration means disposed to remove heat from the first refrigeration means, said first refrigeration means being heat-powered and having a heat-input portion disposed in heat-receiving relation to a portion of an exhaust-gas path of said engine, said second refrigeration means being heat-powered and having a heat-input portion disposed in said exhaust-gas path downstream of said heat-input portion of said first refrigeration means.

2. The engine of claim 1 in which said second refrigeration means includes cooling means for removing heat from air approaching said first refrigeration means.

3. The engine of claim 2 including a cyclonic separator in an air flow path between said cooling means and said air inlet.

4. The engine of claim 1 in which each said refrigeration means includes a flow-circuit for a refrigerant; each said flow-circuit including a vapour generator forming the respective said heat-input portion, a jet-type compressor, a condenser, an evaporator, a heat-exchange matrix for cooling said air, vapour return means leading from said evaporator to said compressor, and a feed pump for returning liquid refrigerant under pressure to said vapour generator; said heat-exchange matrix of said second refrigeration means being disposed to remove heat from said air approaching said heat-exchange matrix of said first refrigeration means, and said condenser of said first refrigeration means being in heat-exchange relationship with a portion of said flow-circuit of said second refrigeration means lying between said evaporator and said heat-exchange matrix of said second refrigeration means.

5. The engine of claim 4, including a cyclonic separator in an air-flow path between said heat-exchange matrices.

6. In an internal combustion engine having an air inlet, at least one compression stage for said air, a fuel supply, a combustion chamber for burning said fuel with compressed air to supply power to an output member, and refrigeration means arranged to extract heat from air supplied to said inlet prior to the or each compression stage, said refrigeration means being heat-powered and including a heat-input portion disposed in heat-receiving relation to a portion of an exhaust-gas path of said engine, a flow-circuit for a refrigerant, said flow-circuit including a vapour generator forming said heat-input portion, a jet-type compressor, a condenser, an evaporator, a heat-exchange matrix for cooling said air, vapour return means leading from said evaporator to said compressor, and a feed pump for returning liquid refrigerant under pressure to said vapour generator, said feed pump being a free-piston pump interconnected to said vapour generator so as to be powered by vapour from said vapour generator.

* * * * *